United States Patent
Wang et al.

(10) Patent No.: US 6,930,856 B2
(45) Date of Patent: Aug. 16, 2005

(54) MULTIPLE SHROUD BYPASS FOR BULK WINDAGE REDUCTION

(75) Inventors: Peter Fei Wang, Savage, MN (US); Stephen Peter LeClair, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 8 days.

(21) Appl. No.: 10/228,426

(22) Filed: Aug. 27, 2002

(65) Prior Publication Data

US 2003/0169531 A1 Sep. 11, 2003

Related U.S. Application Data

(60) Provisional application No. 60/362,911, filed on Mar. 8, 2002.

(51) Int. Cl.⁷ ............................................. G11B 33/14
(52) U.S. Cl. .................................................. 360/97.02
(58) Field of Search .......................... 360/97.01, 97.02, 360/97.03

(56) References Cited

U.S. PATENT DOCUMENTS

| | | |
|---|---|---|
| 4,008,492 A | 2/1977 | Elsing |
| 5,526,203 A | 6/1996 | Mohajerani et al. |
| 5,631,787 A | 5/1997 | Huang et al. |
| 5,898,545 A | 4/1999 | Schirle |
| 5,907,453 A * | 5/1999 | Wood et al. ............. 360/97.02 |
| 6,091,570 A | 7/2000 | Hendriks |
| 6,125,003 A | 9/2000 | Tsuda et al. |
| 6,147,834 A | 11/2000 | Srikrishna et al. |
| 6,369,977 B1 | 4/2002 | Imai et al. |
| 6,369,978 B1 | 4/2002 | Shimizu et al. |
| 2002/0030924 A1 | 3/2002 | Shimizu et al. |
| 2002/0039253 A1 | 4/2002 | Imai et al. |

FOREIGN PATENT DOCUMENTS

| | | |
|---|---|---|
| EP | 0 744 747 A1 | 11/1996 |
| GB | 1 412 479 A | 11/1975 |

* cited by examiner

*Primary Examiner*—David D. Davis
(74) *Attorney, Agent, or Firm*—Westman, Champlin & Kelly, P.A.

(57) ABSTRACT

A housing providing for improved windage characteristics in a disc drive, the housing having a multiple bypass configured to receive and direct fluid flow away from a rotating disc pack assembly. The housing further includes a shroud to contain some fluid flow with the disc pack assembly.

12 Claims, 5 Drawing Sheets

MULTIPLE SHROUD BYPASS FOR BULK WINDAGE REDUCTION

CROSS REFERENCE TO RELATED APPLICATIONS

This application claims the benefit of U.S. provisional application No. 60/362,911, filed Mar. 8, 2002.

FIELD OF THE INVENTION

The present invention relates generally to disc drives. More particularly, the present invention relates to improving fluid flow conditions in a disc drive.

BACKGROUND OF THE INVENTION

A disc drive typically includes a rigid housing or deck supporting a disc stack assembly and an actuator, among other components. The disc pack assembly includes one or more discs that are rotated by a spindle motor during drive operations. Using read/write devices positionable by the actuator assembly, data is read from and written to tracks on a disc surface.

Ideally, the tracks would be circular with its center coincidental with the axis of rotation of the spindle motor. However, in reality, various factors contribute to track mis-registration or overall run-out, resulting in tracks that deviate from the ideal. Understandably, such error can have an adverse impact on the overall performance of the disc drive.

Significant contribution to track misregistration or overall run-out can come from a behavior commonly referred to as "disc flutter"—a phenomenon where the disc is deformed in vibrational motion such that it no longer presents a flat plane for the writing or reading of data. This behavior can be especially problematic at high spindle motor speeds, and needs to be addressed if overall disc drive performance is to be improved.

It is understood that as the disc rotates, air around the disc surfaces is dragged into motion. A substantial portion of the air or other gaseous fluid near the axis of rotation spins in nearly solid body rotation along with the disc pack. Nearer to the outer edges of the discs, however, the surrounding fluid is pumped away from the disc pack assembly by centrifugal forces. Yet other fluid flow streams are generated whereby they flow between adjacent discs towards the inner edges of the discs. Collectively, turbulent flow around the disc pack assembly induces disc flutter and provokes excitation of the read/write heads, thus contributing to track mis-registration and overall run-out, among other problems.

Earlier work to reduce disc flutter has been directed towards providing as extensive a shroud as possible around the disc pack. A shroud can be generally described as a surface substantially transverse to the disc surface and circumscribing the disc pack assembly. The shroud therefore prevents air from flowing off the outer edges of the discs and thereby promotes laminar flow behavior in the vicinity of the disc pack assembly.

In addition to promoting less turbulent fluid flow around the disc pack assembly, a shroud is sometimes used to reduce or maintain the power requirements of the spindle motor. When fluid is allowed to flow out from the vicinity of the disc pack assembly, replacement fluid flows into the vicinity of the disc pack assembly. A certain amount of energy would be expended by the spindle motor to bring this replacement fluid up to speed. Therefore, if fluid can be prevented from flowing out of the disc pack assembly in the first place, for example, by use of a shroud, less energy and a lower power requirement for the spindle motor would be needed.

It would appear, however, that with some disc drive configurations, simply providing an extensive shroud may not offer sufficient improvement because significant run-out issues remain. Clearly, the interplay of the surrounding fluid with a rotating disc pack assembly and read/write devices suspended in the fluid flow creates several challenging issues, of which only a few have been described above. The task of finding a practicable solution to these and other problems is complicated by the fact that much remains to be learnt of windage issues, and that care must be taken not to create new problems while trying to solve existing ones.

Therefore, there remains a need for better solutions to these and other problems. The present invention attempts to satisfy such a need while at the same time offer additional advantages over the prior art.

SUMMARY OF THE INVENTION

The present invention relates to a disc drive housing that provide for multiple diversions from a primary flow generated by a rotating disc pack assembly. According to one embodiment of the present invention, there is provided a disc drive housing defining a first chamber, a second chamber and a third chamber. The first chamber includes at least one flow opening providing for communication with the third chamber while the second chamber and the third chamber communicate via another separate opening. The first chamber also includes at least one other flow opening providing for communication with one of the second chamber or the third chamber. The disc drive housing may be used in a disc drive where the first chamber is configured to house a disc pack assembly and the second chamber is configured to house an actuator. An actuator access opening is provided between the first chamber and the second chamber for the actuator to access the disc pack assembly. When the disc pack assembly is in rotation, part of the primary flow generated in the first chamber is diverted into the third chamber. Part of the primary flow may be also be directed to the second chamber either directly from the first chamber or indirectly through the third chamber. The provision of multiple diversions from the primary flow such that the diverted flow is not immediately introduced back into the primary flow produces significantly improved windage characteristics over that of conventional disc drives. These and various other features as well as advantages which characterize the present invention will be apparent upon reading of the following detailed description and review of the associated drawings.

DETAILED DESCRIPTION

Figure 1:
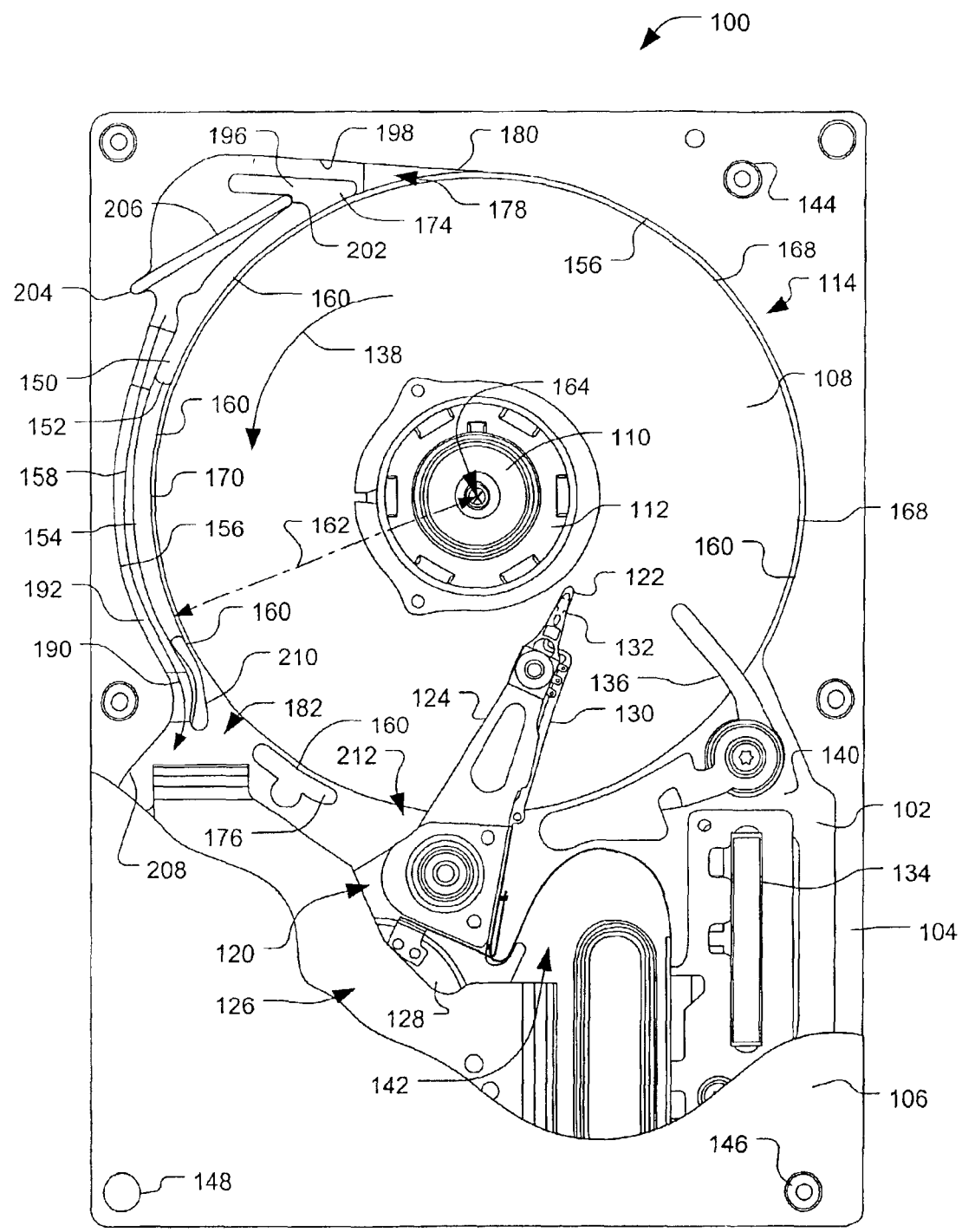
FIG. 1 is a top view of a disc drive according to one embodiment of the present invention.

FIG. 1 is a top view of a disc drive 100 according to one embodiment of the present invention. A base 102, an external wall 104 extending around the perimeter of the base and an attached complementary cover 106 form a housing within which various disc drive components may operate. The cover 106 is partially cut away to better show the disc drive components.

Figure 2:
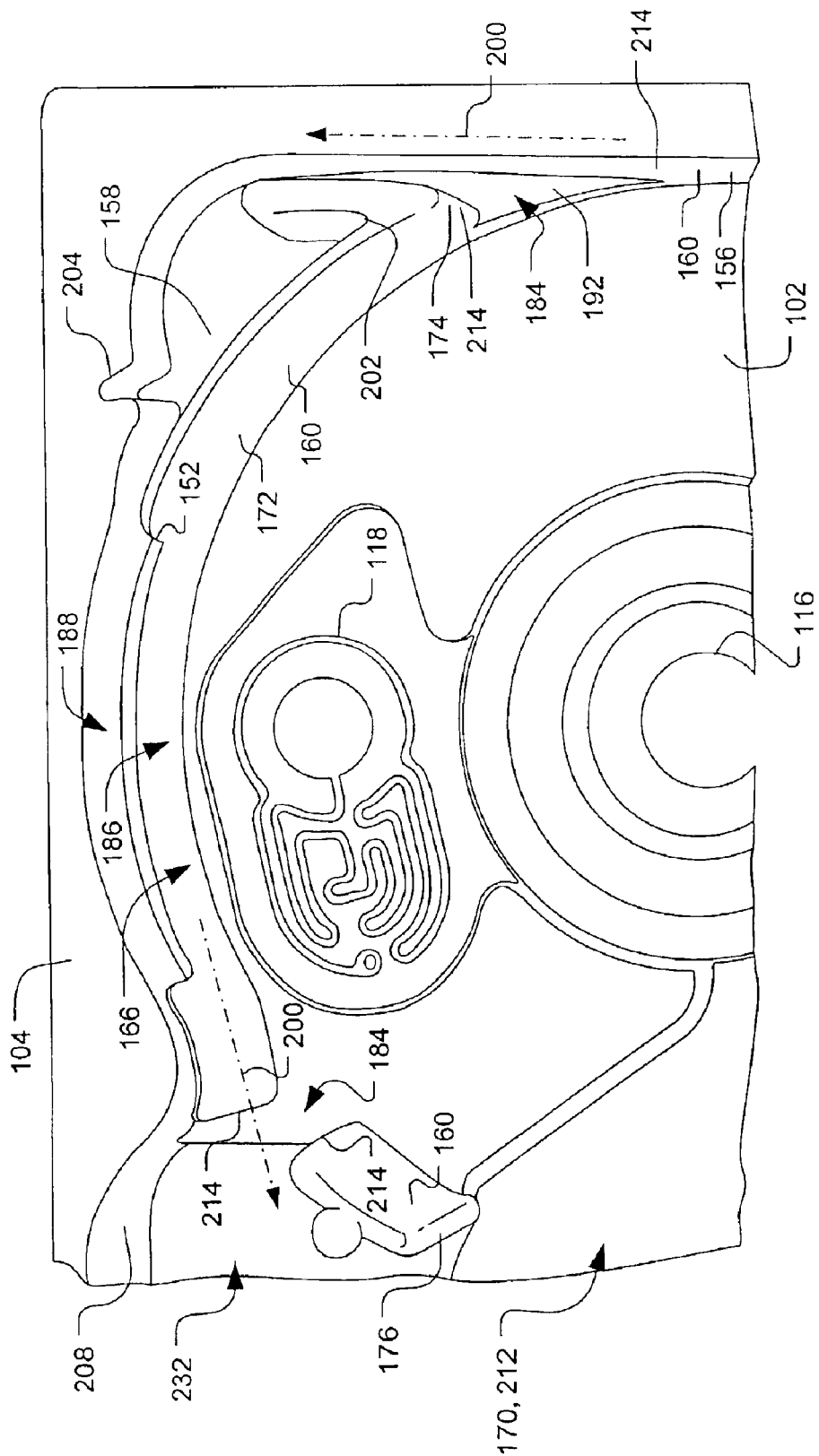
FIG. 2 is a partial top view of a base of FIG. 1.

One or more discs 108 are secured to a spindle motor 110 by a disc clamp 112, forming a disc pack assembly 114 rotatable relative to the base 102. Referring also to FIG. 2, the base 102 includes a mounting hole 116 for engaging a lower and stationary portion of the spindle motor. The mounting hole 116 further provides for access of the spindle motor circuitry to the relevant circuitry on the printed circuit board assembly mounted to the lower face of the base plate. As an optional feature, a serpentine breather 118 may be incorporated in the base 102 for equalizing pressure in the disc drive with that of the ambient. An actuator assembly 120 is pivotably mounted to the base 102 to one side of the disc pack assembly 114 such that the actuator assembly 120 may be rotated between an inner diameter position (where read/write devices 122 suspended from the actuator 124 are brought near an inner edge of the disc) and an outer diameter position (where the read/write devices 122 are brought near an outer edge of the disc). Rotation of the actuator assembly 120 is effected by a voice coil motor 126 formed by one or more magnets fixed relative to the base 102 and a voice coil 128 fixedly extending from the actuator 124. The read/write devices 122 are operably connected to flexible printed circuits 130 routed alongside the suspension 132 and the actuator 124, and leading to a connector 134 for operable connection to control circuitry found on a printed circuit board assembly secured to the outer or lower face of the base. In the case where the disc pack assembly 114 is configured to rotate in an anticlockwise direction and fluid surrounding the disc pack assembly is dragged into a substantially anticlockwise flow around the axis of rotation, a flow modifying module 136 may be located downstream of the actuator assembly 120.

For ease of description, the base 102 is taken to generally define a reference plane even though it may not be a completely flat surface. The disc pack assembly 114 may be described as being configured to rotate in an anticlockwise direction about an axis substantially perpendicular to the plane of reference, although it will be understood that the present invention is similarly applicable in disc drives where the disc pack assembly is configured to rotate in a clockwise direction. The terms "upstream" and "downstream" will be understood to be made with reference to the substantially anticlockwise fluid flow 138 generated when the disc pack assembly 114 is in rotational motion.

The external wall 104 extends a given height from the perimeter of the base 102 on the side of the inner surface 140 of the base. The external wall 104 is formed substantially transverse to the reference plane. The external wall 104 may be provided with a varying thickness so as to maximize the volume of the general cavity 142 and yet allow for attachment to the cover 106. The external wall 104 may thus be provided with tapped holes 144 at intervals along its length for engaging screws 146 threaded through corresponding holes 148 in the cover 106.

An internal wall 150 extends from the inner surface 140 of the base, generally to approximately the same height as the external wall 104. Variation in the height of the internal wall 150 along its length may be made to allow for proper mating with the cover 106, as shown by the indent 152. The internal wall 150 is spaced from the external wall 104 such that an outer surface 154 of the internal wall and part of the inner surface 156 of the external wall defines a bypass or a channel 158. A shroud 160 is formed at a set radial distance 162 from a nominal center 164 of the mounting hole 116 for the spindle motor or the axis of rotation of the disc pack assembly. The shroud 160 defines a generally cylindrical space or cavity 166 suitable for accommodating the disc pack assembly 114 such that the disc pack assembly 114 can freely rotate when mounted in the cavity 166, with the shroud 160 being minimally spaced from the edge 168 of the disc or discs 108 of the stack assembly designed for mounting to the base 102.

FIG. 2 shows only part of the shroud 160 that is adjacent the bypass 158. Referring to FIG. 1, the shroud 160 may be described as including part of the inner surface 156 of the external wall beginning downstream of the intended location 170 of the actuator assembly 120 and adjacent to the disc pack assembly 114. The shroud 160 further includes the inner surface 172 of the internal wall beginning from a first end 174 of the internal wall, and ending in a second end 176 upstream from the intended location 170 of the actuator assembly. A first break 178 in the shroud 160 is defined between the first end 174 of the internal wall and a neighboring portion 180 of the external wall. A second break 182 in the shroud 160 is defined along the internal wall 150, upstream of the intended location 170 of the actuator assembly. The breaks (generally denoted by 184) are thus spaced apart along the length of the shroud 160 along the circumference of the cavity 166. As shown, the breaks 184 extend through the height of the shroud such that they are substantially perpendicular to the reference plane. The shroud 160 may alternatively be described as having a concave side 186 facing the cavity 166 and a convex side 188 facing away from the cavity 166.

When the disc pack assembly 114 is rotated in an anticlockwise direction, surrounding fluid or air is dragged into forming a primary flow 138 that is substantially directed in the anticlockwise direction around the spindle motor 110. At the first break 178, a secondary flow 190 is diverted from the primary flow 138 into the bypass 158. The secondary flow 190 continues in the bypass 158, separate from the primary flow 138. At the second break 182, further diversion from the primary flow 138 to the secondary flow 190 occurs.

The bypass 158 is further defined by a lower surface 192 provided by part of the base and an upper surface provided by part of the cover. In the bypass 158, the base 102 may be raised to different elevations to take into consideration the offset provided by the spindle motor and to facilitate better flow conditions for the secondary flow 190. Except for the breaks 184, both the internal wall 150 and the external wall 104 present substantially smooth curvilinear planes for directing fluid flow. The first end 174 of the internal wall may extend inward of the bypass to form a guide 196. The guide 196 and the opposing inner surface 198 of the external wall guides the diverted flow 190 in a direction 200 substantially tangential to the disc pack assembly 114 at the first break 178. The guide 196 and part of the outer surface of the internal wall forms a niche 202. The niche 202 and an opposing slot 204 in the external wall together serve to hold a filter 206 in the way of the secondary flow 190. Preferably, the filter 206 is oriented so that it is substantially perpendicular to the secondary flow 190. At the second break 182, the internal wall 150 may be angled away from the disc pack assembly 114 so as to facilitate the diversion of flow from the primary flow 138 in a direction 200 substantially tangential to the disc pack assembly. Further, the internal wall 150 may be angled away from the disc pack assembly 114 to inhibit the secondary flow 190 from rejoining the primary flow 138 at the second break 182. To complete the shroud 160, the internal wall 150 continues from the second break 182 to the second end 176 just upstream of the intended location of the actuator assembly. To accommodate the voice coil motor 126 within the confines of the external wall 104, part of the voice coil motor 126 may protrude into the bypass 158 near this end 232 of the bypass 158. The inner surface 208 of the external wall may at this location lead away from the voice coil motor 126 to provide for a widening of the bypass 158 or to provide for discharge of the secondary flow 190 away from the disc pack assembly 114. Particularly in the example where a break is provided near the voice coil motor, the inner surface 208 of the external wall is spaced apart from the voice coil motor 126 and the internal wall 210 is contoured to facilitate the diversion of flow from the primary flow 138 into the bypass 158 and away from the disc pack assembly 114.

Where there is no break, the shroud 160 presents a substantially smooth curvilinear plane 234, shaped to substantially follow the curvature of the disc pack assembly 114. The shroud 160 is sized for minimal clearance between the disc pack assembly 114 and the shroud 160 for the disc pack assembly 114 to freely rotate. This allows for containment of some of the primary flow 138, and thus conserves power requirements of the spindle motor 110. At the same time, the shroud 160 is provided with more than one break 184, other than the opening 212 required for the actuator assembly 120 to access the disc pack assembly 114. By providing a bypass 158 or conduit so that the secondary flow 190 is substantially separated from the primary flow 138 the bulk windage properties of the primary flow is improved, resulting in reduced disc flutter and reduced excitation of the read/write devices 122. Thus, the multiple diversions into the bypass 158 can reduce the non-repeatable run-out or track mis-registration in a disc drive 100.

Figure 3:
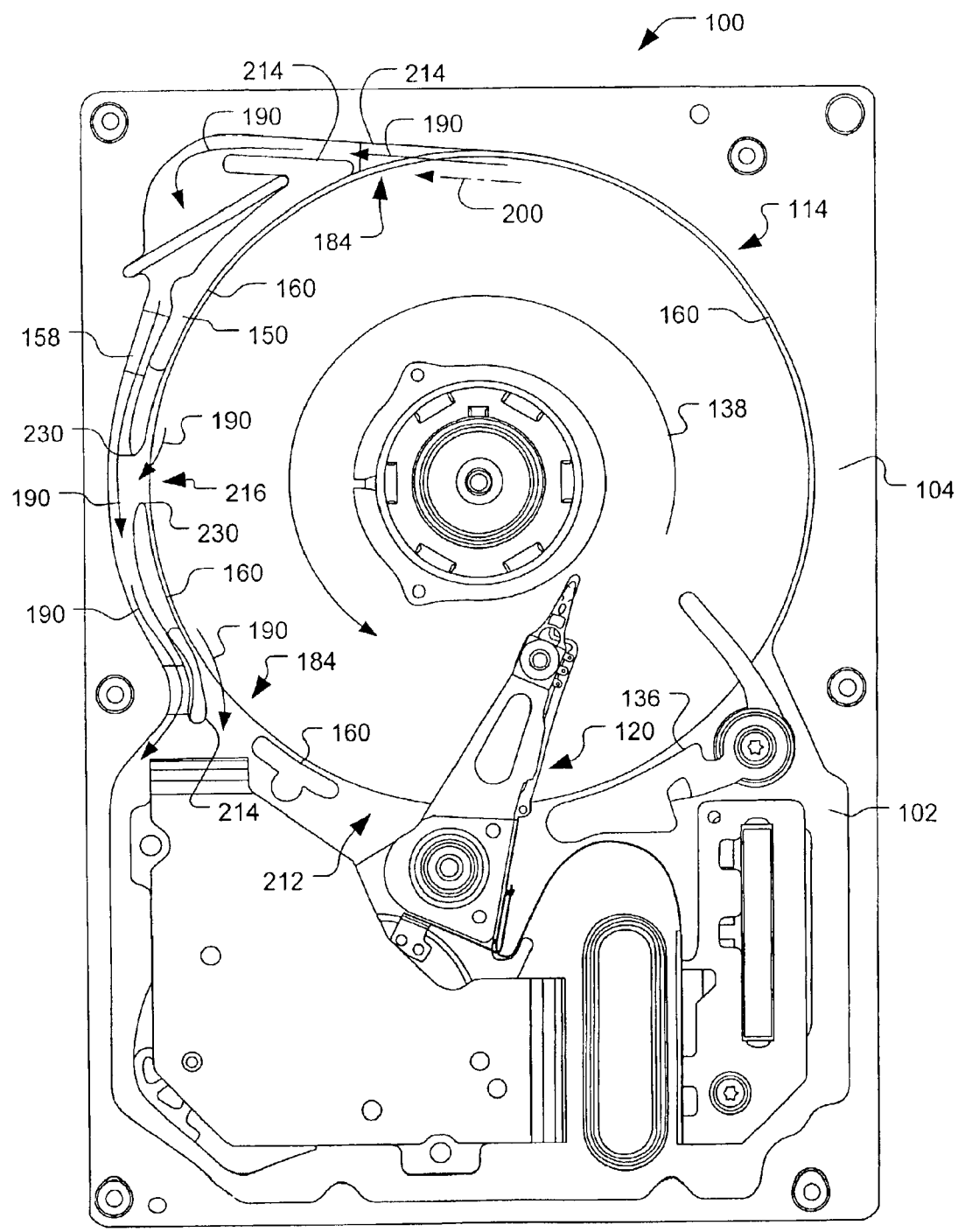
FIG. 3 is a top view of a disc drive according to a second embodiment of the present invention.

Turning to FIG. 3, an alternative embodiment of the present invention is shown in which there is provided multiple breaks 184 in the shroud 160 to provide for multiple outlets from the primary flow 138 to the secondary flow 190 in the bypass 158. The shroud 160 partially circumscribe a disc pack assembly 114 such that an opening 212 is provided for the actuator assembly 120 and a flow modifying module 136. The shroud 160 is provided, in this example, with three breaks 184 leading to a neighboring bypass 158. Not all of the breaks 184 in the shroud necessarily include sides 214 that lead off in a direction 200 substantially tangential to the primary flow 138 and into the bypass 158. For example, a break 184 may be a simple open slot 216 delimited by edges 230 in the shroud 160, the slot 216 extending transversely with respect to the reference plane. Alternatively, at least one of the edges 214 may be contoured to lead away from the cavity 166 where the disc pack assembly is mounted or from the primary flow 138.

Figure 4:
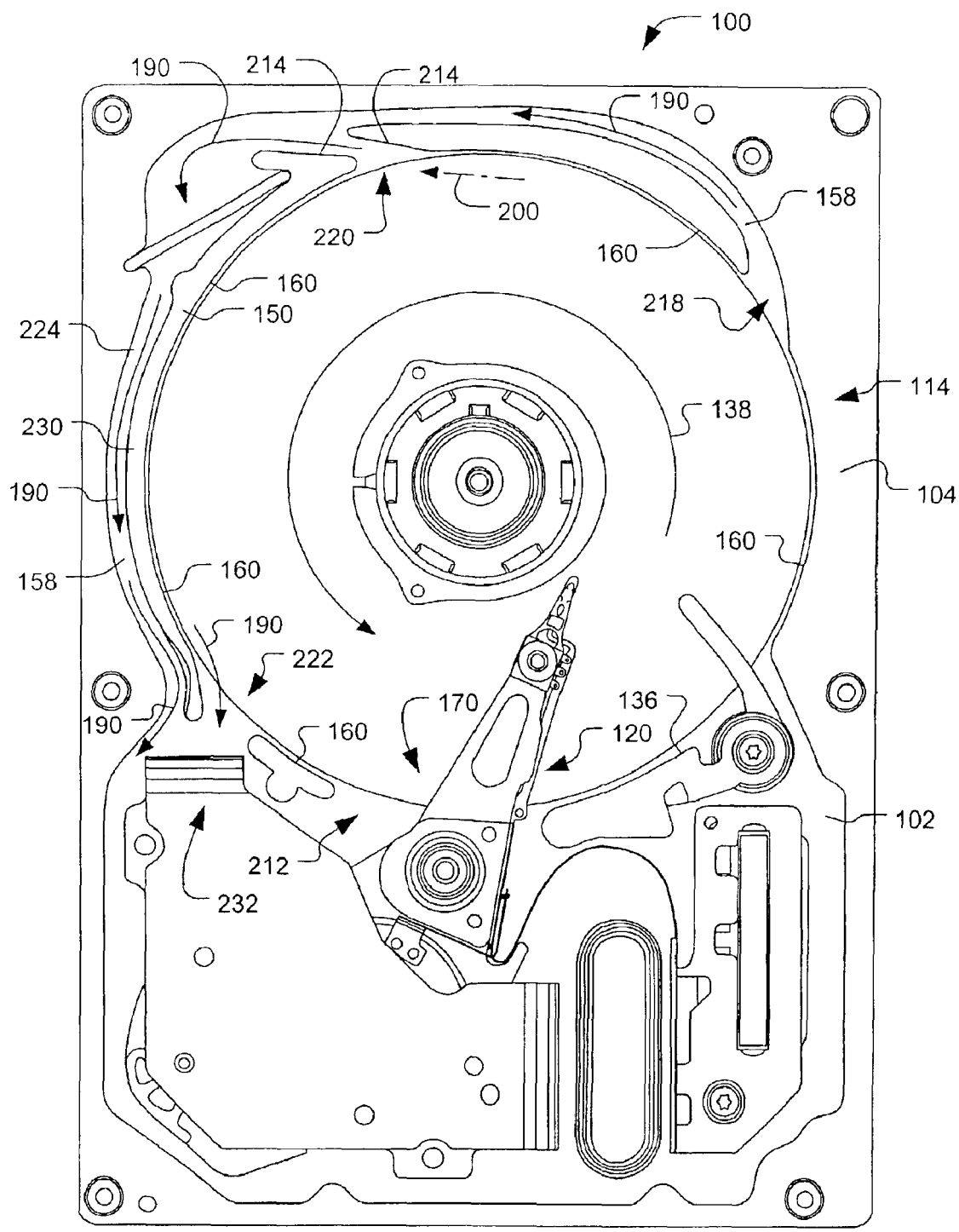
FIG. 4 is a top view of a disc drive according to a third embodiment of the present invention.

FIG. 4 shows another embodiment of the present invention where the bypass 158 begins even further upstream from the intended location 170 of the actuator assembly. The bypass 158 begins at the first break 218 in the shroud 160, continues around the shroud 160 to an end 232 in the vicinity of the intended location 170 of the actuator assembly, just upstream of the intended location 170 of the actuator assembly. According to the present invention, the embodiment includes more than one break in the shroud leading to the bypass 158. In the particular example shown, three breaks 218, 220, 222 are provided in the shroud 160. Further in this example, the base 224 within the bypass 158 is substantially at the same elevation as the much of the rest of the base 102.

Figure 5:
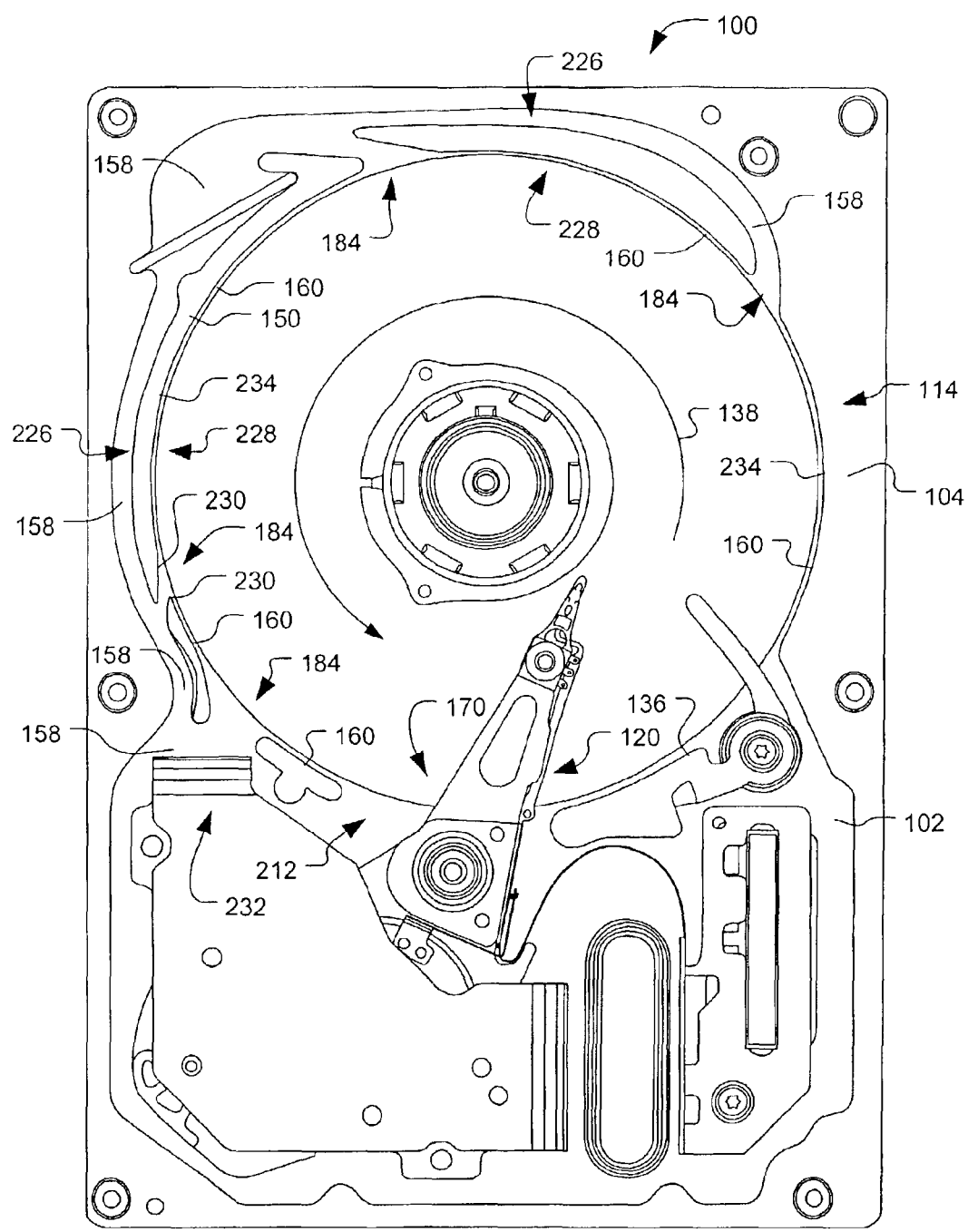
FIG. 5 is a top view of a disc drive according to a fourth embodiment of the present invention.

FIG. 5 illustrates yet another embodiment of the present invention where the bypass 158 circumscribe part of the shroud 160 and the shroud 160 includes more than one break 184 for communication between the bypass 158 on one side 226 of the shroud and the space or cavity on the other side 228 of the shroud. Thus, as shown by the various embodiments described in the foregoing, the number of the breaks 184 may vary. In addition, the breaks 184 are spaced apart along the length of the shroud 160. The angular position of the breaks relative to the intended location 170 of the actuator assembly may vary. The variations may be made to allow for different spindle motor speeds or different disc pack assembly sizes such that the desired amount of diversion from the primary flow is extracted.

Alternatively described, one embodiment of the present invention includes a base (such as 102) having a shroud (such as 160). The shroud (such as 160) has at least two breaks (such as 184) spaced apart along a length of the shroud (such as 160) such that the breaks (such as 184) communicate a first side (such as 188, 226) of the shroud with a second side (such as 186, 228) of the shroud. A bypass (such as 158) is provided on the first side (such as 188, 226) of the shroud. The bypass (such as 158) terminates in an end (such as 232) that is directed away from the second side (such as 186, 228) of the shroud.

The bypass (such as 158) may run from one of the breaks (such as 184) in the shroud to the end (such as 176) directed away from the second side (such as 186, 228) of the shroud. The bypass (such as 158) may be an arcuate conduit extending alongside the shroud (such as 160). Each one of the breaks (such as 184) may be delimited by two edges (such as 214) of the shroud, in which at least one of the edges (such as 214) lead away from the concave side (such as 186, 228) of the shroud. Optionally, at least one of the edges (such as 214) provides a surface (such as 196, 210) substantially tangential to the shroud (such as 160). The shroud (such as 160) may be described as presenting a substantially curvilinear plane on the first side (such as 188, 226) of the shroud and another substantially curvilinear plane on the second side (such as 186, 228) of the shroud. The breaks (such as 184) may extend substantially transversely to a reference plane defined by the base (such as 102). The base (such as 102) may further include a filter (such as 206) located in the bypass (such as 158).

According to another embodiment of the present invention, there is provided a disc drive (such as 100) having a base (such as 102) as described in the foregoing, with a disc pack assembly (such as 1114) mounted to the base (such as 102) on the second side (such as 186, 228) of the shroud.

According to yet another embodiment of the present invention, there is provided a disc drive (such as 100) having a base (such as 102), a shroud (such as 160) extending from the base (such as 102) and substantially defining a cavity (such as 166), and a bypass (such as 158) adjacent the cavity (such as 166) and terminating in an end (such as 232) directed away from the cavity (such as 166). There are at least two breaks (such as 184) in the shroud (such as 160) communicating the cavity (such as 166) with the bypass (such as 158) with the breaks (such as 184) being spaced apart along a perimeter of the cavity (such as 166).

The disc drive (such as 100) is optionally configured such that the bypass (such as 158) runs from one of the breaks (such as 178, 218) in the shroud (such as 160) to the end (such as 232) directed away from the second side (such as 186, 228) of the shroud. The bypass (such as 158) may be shaped as an arcuate conduit extending alongside the shroud (such as 160). Each one of the breaks (such as 184) may be described as being delimited by two edges (such as 214) of the shroud in which at least one of the edges (such as 214) lead away from the cavity (such as 166). Further, at least one of the edges (such as 214) may provide a surface (such as 196, 210) substantially tangential to the cavity. The shroud (such as 160) may be said to present a substantially curvilinear plane (such as 156, 234) facing the cavity (such as 166) and another substantially curvilinear plane (such as 154) on facing the bypass (such as 158). The breaks (such as 184) may extend substantially transversely to a reference plane defined by the base (such as 102). The disc drive (such as 100) may further include a filter (such as 206) located in the bypass (such as 158).

Alternatively described, the disc drive (such as 100) includes a primary flow (such as 138) substantially in the cavity (such as 166) that is generated by the disc pack assembly (such as 114) when in rotation. The disc drive (such as 100) may further include a secondary flow (such as 190) in the bypass (such as 158) where the secondary flow (such as 190) is diverted from the primary flow (such as 138) through the breaks (such as 184) and discharged through the end (such as 232) of the bypass away from the disc pack assembly (such as 114).

The provision of multiple breaks in the shroud, in addition to the opening provided for the actuator assembly, provides for improved bulk windage properties. At the same time, the shroud provides for substantial containment of the primary flow so as to maintain the efficiency of the spindle motor. The bypass separates the secondary flow from the primary flow so that the secondary flow is not directly returned to the primary flow, thereby overcoming problems associated with increased turbulent primary flow which may contribute to undesirable excitation of the read/write devices. The edges delimiting the breaks in the shroud are thus shaped to inhibit the secondary flow from returning directly to the primary flow, thereby providing the separate flow in the bypass. Improvements in the bulk windage properties overall lead to a disc drive capable of improved performance.

It is to be understood that even though characteristics and advantages of various embodiments of the present invention have been set forth in the foregoing description, the disclosure is illustrative only, and changes may be made in detail, especially in matters of structure and arrangement of parts within the principles of the present invention to the full extent indicated by the broad general meaning of the terms in which the appended claims are expressed. For example, the desired locations of the flow openings may vary depending on the characteristics of the primary flow generated in a particular disc drive. In addition, although the preferred embodiment described herein is directed to a disc drive housing, it will be appreciated by those skilled in the art that the teachings of the present invention can be applied to other data storage devices, without departing from the scope of the present invention.

What is claimed is:

1. A disc drive comprising:
a base;
a shroud extending from the base and substantially defining a cavity containing a disc medium;
a bypass adjacent the cavity and terminating in an end directed away from the cavity; and
at least two breaks in the shroud extending between the cavity and the bypass, the breaks being spaced apart along a circumferential perimeter of the cavity and defining two ends of the bypass.

2. The disc drive of claim 1 in which the bypass runs from one of the breaks in the shroud to the end directed away from the second side of the shroud.

3. The disc drive of claim 1 in which the bypass is an arcuate conduit extending alongside the shroud.

4. The disc drive of claim 1 which each one of the breaks is delimited by two edges of the shroud, and in which at least one of the edges lead away from the cavity.

5. The disc drive of claim 4 in which at least one of the edges provide a surface substantially tangential to the cavity.

6. The disc drive of claim 1 in which the shroud presents a substantially curvilinear plane facing the cavity and another substantially curvilinear plane on facing the bypass.

7. The disc drive of claim 1 in which the breaks extend substantially transversely to a reference plane defined by the base.

8. The disc drive of claim 1 further comprising a filter located in the bypass.

9. The disc drive of claim 1 comprising a primary flow substantially in the cavity, the primary flow being generated by the disc pack assembly when in rotation.

10. The disc drive of claim 9 further comprising a secondary flow in the bypass, the secondary flow being diverted from the primary flow through the breaks and discharged through the end of the bypass away from the disc pack assembly.

11. The disc drive of claim 1 wherein the shroud includes an additional break spaced along a length of the shroud and the disc drive further includes a second bypass communicating with the additional break and one of the at least two breaks.

12. A disc drive comprising:
a housing having a shroud;
a disc pack assembly mounted to the housing and substantially surrounded by the shroud; and
bypass means terminating at two circumferential perimeter breaks spaced apart along the shroud for diverting flow generated by the disc pack assembly in rotation such that a diverted flow is not directly returned to the disc pack assembly.

* * * * *